United States Patent [19]  
Dobbelstein et al.

[11] Patent Number: 4,780,524  
[45] Date of Patent: Oct. 25, 1988

[54] WATER-DILUTABLE BINDERS FOR CATIONIC ELECTROCOATING FINISHES AND A PROCESS FOR THE PREPARATION THEREOF

[75] Inventors: Arnold Dobbelstein; Michael Geist; Günther Ott, all of Münster; Georg Schön, Everswinkel, all of Fed. Rep. of Germany

[73] Assignee: BASF Lacke + Farben AG, Münster-Hiltrup, Fed. Rep. of Germany

[21] Appl. No.: 9,956
[22] PCT Filed: May 17, 1986
[86] PCT No.: PCT/EP86/00303
 § 371 Date: Jan. 23, 1987
 § 102(e) Date: Jan. 23, 1987
[87] PCT Pub. No.: WO86/07083
 PCT Pub. Date: Dec. 4, 1986

[30] Foreign Application Priority Data

May 24, 1985 [DE] Fed. Rep. of Germany ....... 3518770

[51] Int. Cl.$^4$ .................. C08G 59/50; C08L 63/02; C09D 5/44
[52] U.S. Cl. .................. 528/104; 523/414; 525/510; 525/528; 528/108; 528/109; 528/110; 528/111; 528/113; 528/122; 528/341; 528/374
[58] Field of Search ............ 528/104, 108, 109, 110, 528/111, 122, 113, 341, 374, 73; 525/528, 510; 523/414

[56] References Cited

U.S. PATENT DOCUMENTS

| | | | |
|---|---|---|---|
| 4,246,089 | 1/1981 | Hazan | 525/450 X |
| 4,593,078 | 6/1986 | Kooymans et al. | 523/404 X |
| 4,609,446 | 9/1986 | Geist et al. | 523/415 X |
| 4,609,691 | 9/1986 | Geist et al. | 523/415 |
| 4,624,974 | 11/1986 | Geist et al. | 523/415 X |
| 4,686,248 | 8/1987 | Bekooij et al. | 523/415 X |

*Primary Examiner*—Earl Nielsen
*Attorney, Agent, or Firm*—Kenyon & Kenyon

[57] ABSTRACT

The invention relates to a water-dilutable binder for cationic electrocoating finishes. For the preparation of the binders (A) a di-epoxide compound with an epoxide equivalent weight below 2,000 is reacted with (B) a phenol- or thiol-containing compound which reacts monofunctionally with epoxide groups, and with (C) primary and/or secondary amines or their salts and/or the salt of a tertiary amine, a sulfide/acid mixture or phosphine/acid mixture or a mixture of these compounds, as well as, if desired, with (D) a polyfunctional alcohol, a polycarboxylic acid, a polysulfide or a polyphenol.

The components A and B are used in a molar ratio of from 10:1 to 1:1, preferably from 4:1 to 1.5:1 and the reaction of the component A with the component B is carried out at 100° to 190° C., if desired in the presence of a catalyst.

14 Claims, No Drawings

WATER-DILUTABLE BINDERS FOR CATIONIC ELECTROCOATING FINISHES AND A PROCESS FOR THE PREPARATION THEREOF

The present invention relates to water-dilutable binders for cationic electrocoating finishes based on modified epoxy resins containing ammonium, sulfonium and/or phosphonium groups.

Cationic electrocoating is a coating process frequently used especially for priming, in which synthetic resins carrying water-dilutable cationic groups are deposited by direct current on electrically conducting objects.

The use of modified epoxy resins as binders for cationic electrocoating finishes is known (U.S. Pat. Nos. 4,104,147; 4,260,720).

The modified epoxy resins that have been hitherto available for use in cationic electrocoating finishes are only poorly compatible with aliphatic hydrocarbons, are in need of improvement in respect of their flexibility and give rise to coats that cannot be overcoated without problems and have to be further thickened.

An object of the present invention was to develop novel modified epoxy resins that would be free from the disadvantages outlined above.

The object according to the invention was achieved by the development of binders which are obtainable by reacting (A) a di-epoxide compound, or a mixture of di-epoxide compounds, having an epoxide equivalent weight below 2,000, with (B) a pnehol- or thiol-containing compound which, under the given reaction conditions, reacts monofunctionally with epoxide groups, or a mixture of such compounds, and with (C) primary and/or secondary amines or their salts and/or the salt of a tertiary amine, a sulfide/acid mixture or phosphine/acid mixture or a mixture of these compounds, as well as, if desired, with (D) a polyfunctional alcohol, a polycarboxylic acid, a polyamine, a polysulfide, a polyphenol or a mixture of these compounds, the components A and B being used in a molar ratio from 10:1 to 1:1, preferably from 4:1 to 1.5:1, the reaction of component A with component B being carried out at 100° to 190° C., if desired in the presence of a catalyst, and, if further desired, the dilutability with water being obtained by protonization with a water-soluble acid.

The novel modified epoxy resins can be obtained from readily accessible starting materials, and they are distinguished by good compatibility with aliphatic hydrocarbons and by high flexibility.

Their use in cationic electrocoating finishes gives rise to deposition of thick coats which can be satisfactorily overcoated.

It was found that the modification with the component B results in both an increase in flexibility and an increase in the thickness of the deposited coats.

A further reaction with the component D can lead to a further increase in flexibility of the modified eposy resins as well as to a further increase in the thickness of the deposited coats.

All compounds which contain two reactive epoxide groups and have an epoxide equivalent weight below 2,000, preferably below 1,000 and particularly preferably below 500, can e used as component A.

Diglycidyl ethers of polyphenols, prepared from polyphenols and epihalohydrins, are particularly preferred epoxide compounds. Examples of polyphenols which can be used are:

Very particularly preferred: bisphenol A and bis-phenol F

Particularly preferred: 1,1-bis-(4-hydroxyphenyl)-n-heptane

Other suitable compounds are 4,4'-dihydroxybenzophenone, bis-(4-hydroxyphenyl)-1,1-ethane, bis-(4-hydroxyphenyl)-1,1-isobutane, bis-(4-hydroxy-tert.-butylphenyl)-2,2-propane, bis-(2-hydroxynaphthyl)methane, 1,5-dihydroxynaphthalene and phenolic novolak resins.

Preferred epoxide compounds are also diglycidyl ethers of polyvalent alcohols such as ethylene glycol, diethylene glycol, triethylene glycol, 1,2-propylene glycol, 1,4-propylene glycol, 1,5-pentanediol, 1,2,6-hexanetriol, glycerol and bis-(4-hydroxycyclohexyl)-2,2-propane.

Diglycidyl esters of polycarboxylic acids, for example oxalic acid, succinic acid, glutaric acid, terephthalic acid, 2,6-naphthalenedicarboxylic acid, dimerized linolenic acid, etc., can be also used. Typical examples are glycidyl adipate and glycidyl phthalate.

Other suitable compounds are hydantoin epoxides, epoxidized polybutadiene and di-epoxide compounds, obtainable by epoxidization of an olefinically unsaturated alicyclic compound.

All compounds which contain a phenol or thiol group and react monofunctionally with epoxide groups under the reaction conditions prevalent in the preparation of the modified epoxy resins according to the invention can be used as component B.

Compounds of the general formula $R^1$—OH, in which $R^1$ can have the following meaning $R^1$=aryl or

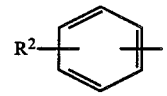

$R^2$=H, alkyl (preferably of 1 to 20 carbon atoms, particularly preferably tert.-butyl, nonyl or dodecyl), $R^3$—O— (preferably in para-position to the phenolic OH group) with $R^3$=alkyl (preferably of 1 to 10 carbon atoms, particularly preferably methyl) or HO—(—$CHR^4CH_2$—O)$_n$—$CHR^4CH_2$— in which $n$=0–10 and $R^4$=H or methyl or a compound of the general formula $R^5$—SH, in which $R^5$ may have the following meaning $R^5$=alkyl (preferably of 1 to 20 carbon atoms, particularly preferably n-butyl and dodecyl), cycloalkyl (preferably cyclohexyl), aryl (particularly preferably phenyl), aralkyl (particularly preferably benzyl), $R^6$—OOC—$CH_2$—, $R^7$—OOC $CH_2CH_2$—

$R^6$, $R^7$=alkyl of 1 to 8 carbon atoms, preferably butyl or 2-ethylhexyl or a mixture of these compounds are used as component B.

The intermediate product prepared from component A and component B has terminal epoxide groups and a mean molecular weight from 400 to 5,000.

Primary or secondary amines and their salts, salts of tertiary amines, sulfide/acid mixtures or phosphine/a- cid mixtures or a mixture of these compounds can be used as component C, the secondary amines being particularly preferred components C.

The amine should preferably be a water-soluble compound. Examples of such amines are mono- and dialkylamines, such as methylamine, ethylamine, propylamine, butylamine, diomethylamine, diethylamine, dipropylamine, methylbutylamine and the like. Alkanolamines, for example methylethanolamine, diethanolamine and the like, are likewise suitable. Dialkylaminoalkylamines, for example dimethylaminoethylamine, diethylaminopropylamine, dimethylaminopropylamine and the like are also suitable.

In the majority of cases amines of a low molecular weight are used, but it is also possible to use monoamines of higher molecular weight.

Polyamines possessing primary and seconary amino groups can react with the epoxide groups in the form of ketimines. The ketimines are prepared from the polyamines in a known manner.

The amines can also contain other groups, but these should not interfere with the reaction of the amine with the epoxy group and, equally, should not lead to gelling of the reaction mixture.

The charges required for dilutability with water and electrodeposition can be produced by protonization with water-soluble acids (for example boric acid, formic acid, lactic acid, propionic acid, butyric acid, hydrochloric acid, phosphoric acid, sulfuric acid, carbon dioxide, and preferably acetic acid) or by reacting the oxirane groups with salts of an amine or a sulfide/acid mixture or phosphine/acid mixture.

The salt of a tertiary amine can be used as the salt of an amine.

The amine part of the amine acid salt is an amine which can be unsubstituted or substituted, as is the case with hydroxylamine, and these substituents should not interfere with the reaction of the amine acid salt with the polyepoxide and not cause gelling of the reacting mixture. Preferred amines are tertiary amines, such as dimethylethanolamaine, triethylamine, trimethylamine, triisopropylamine and the like. Examples of other suitable amines are given in U.S. Pat. No. 3,839,252 in column 5, line 3 to column 7, line 42.

The amine/acid salt mixture is obtained by reaction of the amine with the acid in a known manner. Amine/acid mixtures can also be used, although they react as a rule with the formation of the acid salt.

A reaction of the oxirane groups with a sulfide in the presence of an acid gives rise to resins containing sulfonium groups.

Any sulfides which react with epoxide groups and do not contain groups that would interfere with the reaction can be used as sulfides. The sulfide can be an aliphatic, mixed aliphatic -aromatic, aralkyl or cyclic sulfide. Examples of such sulfides are dialkyl sulfides, such as diethyl sulfide, dipropyl sulfide, dibutyl sulfide, dihexyl sulfide, or alkyl phenyl sulfides, such as diphenyl sulfide, ethyl phenyl sulfide, or alicyclic sulfides, such as tetramethylene sulfide and pentamethylene sulfide, or hydroxyalkyl sulfides, such as thiodiethanol, thiodipropanol, thiodibutanol and the like.

Any acid which forms a tertiary sulfonium salt can be used as acid. An organic carboxylic acid, is, however, preferred as the acid. Examples of suitable acids are boric acid, formic acid, lactic acid, acetic acid, propionic acid, butyric acid, hydrochloric acid, phosphoric acid and sulfuric acid. The acid preferably has a dissociation constant greater than about $1 \times 10^{-5}$.

The sulfide:acid ratio is not particularly critical. Since one equivalent of an acid is used for the formation of one mole of a sulfonium group, at least one equivalent of an acid is preferably used for each desired mole of the conversion of sulfide to sulfonium.

A reaction of the oxirane groups with a phosphine in the presence of an acid gives rise to resins containing phosphonium groups.

Any phosphine that contains no interfering groups can be used as the phosphine. Examples of such phosphines are aliphatic, aromatic or alicyclic phosphines, the following phosphines being specific examples:

Low trialkylphosphines, such as trimethylphosphine, triethylphosphine, tripropylphosphine, tributylphosphine, or mixed low alkylphenylphosphines, such as phenyldimethylphosphine, phenyldiethylphosphine, phenyldipropylphosphine, diphenylmethylphosphine, diphenylethylphosphine, diphenylpropylphosphine, triphenylphosphine, or alicyclic phosphines, such as tetramethylene-ethylphosphine and the like.

Any acid that forms a quaternary phosphonium salt can be used as the acid. An organic carboxylic acid, is, however, preferred as the acid. Examples of suitable acids are boric acid, lactic acid, formic acid, acetic acid, propionic acid, butyric acid, hydrochloric acid, phosphoric acid and sulfuric acid.

The acid should preferably have a dissociation constant greater than about $10^{-5}$.

The phosphine:acid ratio is not particularly critical. Since one equivalent of an acid is required for the formation of one mole of a phosphonium group, at least one equivalent of an acid is preferably used for each mole of the desired conversion of phosphine to phosphonium.

The polyfunctional alcohols, polycarboxylic acids, polyamines or polysulfides which are suitable as the component D have a molecular weight from 300 to 3,500, preferably from 350 to 1,000.

The polyols of the invention include diols, triols and higher polymeric polyols such as polyester polyols, and polyether polyols.

The polyalkylene ether polyols suitable for the component D correspond to the general formula:

in which R is hydrogen or a lower alkyl radical, which may possess various substituents, n is 2 to 6 and m is 3 to 50 or even higher. Examples are poly(oxytetramethylene) glycols and poly(oxyethylene) glycols.

The preferred polyalkylene ether polyols are poly(oxytetramethylene) glycols of a molecular weight in the region from 350 to 1,000.

Polyester polyols can likewise be used in the invention as polymeric polyol components (component D). The polyester polyols can be prepared by polyesterification of organic polycarboxylic acids or their anhydrides with organic polyols containing primary hydroxyl groups. The polycarboxylic acids and the polyols are normally aliphatic or aromatic dicarboxylic acids and diols.

The diols used for the preparation of the polyesters include alkylene glycols such as ethylene glycol, butylene glycol, neopentyl glycol and other glycols such as cyclohexane dimethanol.

The acid component of the polyesters consists primarily of low-molecular carboxylic acids, or their anhydrides with 2 to 18 carbon atoms in the molecule. Examples of suitable acids are phthalic acid, isophthalic acid, terephthalic acid, tetrahydrophthalic acid, hexahydrophthalic acid, adipic acid, azelaic acid, sebabic acid, maleic acid and glutaric acid. Instead of these acids it is possible also to use their anhydrides, insofar as these exist.

In addition, polyester polyols derived from lactones can be used in the invention as component D. These products are obtained by the reaction of a $\epsilon$-caprolactone with a polyol. Such products are described in U.S. Pat. No. 3,169,945.

The polylactone polyols, obtained by this reaction, are distinguished by the presence of a terminal hydroxyl group and by recurring polyester moieties derived from the lactone. These recurring molecular moieties can correspond to the formula

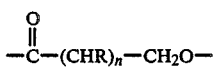

in which n is at least 4, preferably 4 to 6, and the substituent is hydrogen or an alkyl, a cycloalkyl or an alkoxy radical.

Long-chain dicarboxylic acids are used in a further advantageous embodiment of the invention. Examples of these are dimeric fatty acids, such as the dimeric linoleic acid.

Polyamines which are suitable for rendering the coatings flexible can be produced by, for example, reacting primary diamines with monoepoxides. The secondary, substituted diamines formed modify the epoxy resins according to the invention in a suitable manner.

Primary-tertiary diamines, or alkanolamines such as aminoethanol or aminopropanol, can also be used as component D.

Reaction products of organic dihalides with sodium polysulfide are suitable polyfunctional SH compounds (component D). Other SH compounds are, for example, reaction products of hydroxyl-containing linear polyesters, polyethers or polyurethanes with mercaptocarboxylic acids such as mercaptoacetic acid, 2-mercaptopropionic acid, 3-mercaptopropionic acid, mercaptobutyric acid and the like.

Polyphenols which are suitable as component (D) correspond to the general formula (I) as follows

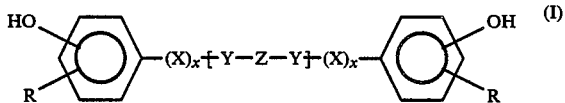

in which:
X = alkylene, arylene, alkarylene
O, O-alkylene, O-arylene, O-alkarylene
S, S-alkylene, S-arylene, S-alkarylene
CO, CO-alkylene, CO-arylene, CO-alkarylene
NH, NH-alkylene, NH-arylene, NH-alkarylene
x = 0 or 1
Y = X, $CO_2$, —O—, —CH=N—, —NHCO—;
Z = a divalent hydrocarbon radical, or a divalent radical of a polyester, a polyether, a polyamide, a polycarbonate, or a polyurethane;

R = H, $CH_3$, alkyl, —O—, —O—alkyl, —$NO_2$, —$NR'_2$, —NR'R", NHCOR''', R', R" and R''' being alkyl groups.

This component (D) can, for example, be prepared advantageously in the following manner. One mole of a high-molecular diol, for example a polyester diol, a polycaprolactone diol, a polyether diol, a polycarbonate diol or the like, is esterified with two moles of a hydroxyphenylcarboxylic acid or is reacted with two moles of a hydroxyphenylcarboxylic acid ester. Suitable hydroxycarboxylic acids, are p-hydroxybenzoic acid, p-hydroxyphenylacetic acid and 3-(4-hydroxyphenyl)-propionic acid, or their esters. If the introduction of the hydroxyphenyl group is carried out by transesterification, a basic transesterification can also be carried out using the alkali metal phenolates of the corresponding hydroxyphenylcarboxylic acid esters. To obtain the desired polyphenol, it is necessary to work up the product under acid conditions after the end of the reaction.

N-(4-Hydroxyphenol)-glycine, for example, can also be used for direct esterification. In a further variant, any acid polyesters can be reacted with p-hydroxyaniline to give the desired polyphenols.

In another advantageous embodiment, polyether diamines or similar polyamines are reacted with, for example, 4-hydroxy-3-methoxybenzaldehyde to give the polyphenols.

The binders prepared according to the invention can be crosslinked by methods known per se by the addition of crosslinking agents or converted to self-crosslinking systems by chemical modification. A self-crosslinking system can be obtained, for example, by reacting the binder with a partially blocked polyisocyanate which has on average one free isocyanate group per molecule and whose blocked isocyanate groups only become unblocked at elevated temperatures.

Virtually all compounds which are at least bivalent and which react with oxirane groups are suitable as crosslinking agents, for example polyalcohols, polyphenols, polycarboxylic acids, polycarboxylic acid anhydrides and acid amides, polyamines, polyisocyanates, phenoplasts, etc.

The crosslinking agents are usually used in amounts from 5 to 60, preferably from 20 to 40, % by weight, based on the binder.

Methods that are frequently used for the crosslinking if binders are published, for example, in the following patent documents: British Pat. No. 1,303,480, European Patent Application No. 12,463, U.S. Pat. No. 4,252,703 and British Pat. No. 1,557,516.

Examples of suitable aminoplast crosslinking agents are the hexamethyl ether of hexamethylolmelamine, the triethyl trimethyl ether of hexamethylolmelamine, the hexabutyl ether of hexamethylolmelamine and the hexamethyl ether of hexamethylolmelamine, and polymeric butylated melamine-formaldehyde resins. Alkylated urea-formaldehyde resins are likewise suitable.

Blocked polyisocyanates are preferably used as crosslinking agents. In the invention, any polyisocyanactes can be used whose isocyanate groups have been reacted with a compound in such a manner that the blocked polyisocyanate formed is non-reactive towards hydroxyl groups at room temperature, but reacts at elevated temperatures, usually in the region from about 90° to about 300° C. To prepare the blocked polyisocyanates, any organic polyisocyanates suitable for the crosslinking can be used. The isocyanates which contain from about 3 to about 36, in particular from about 8 to about 15, carbon atoms are preferred. Examples of suitable diisocyanates are trimethylenediisocyanate, tetramethylenediisocyanate, pentamethylenediisocyanate, hexamethylenediisocyanate, propylenediisocyanate, ethylethylenediisocyanate, 2,3-dimethylethylenediisocyanate, 1-methyltrimethylenediisocyanate, 1,3-cyclopentylenediisocyanate, 1,4-cyclohexylenediisocyanate, 1,2-cyclohexylenediisocyanate, 1,3-phenylenediisocyanate, 1,4-phenylenediisocyanate, 2,4-toluylenediisocyanate, 2,6-toluylenediisocyanate, 4,4'-diphenylenediisocyanate, 1,5-naphthylenediisocyanate, 1,4-naphthylenediisocyanate, 1-isocyanatomethyl-5-isocyanato-1,3,3-trimethylcyclohexane, bis(4-isocyanatocyclohexyl)methane, bis(4-isocyanatophenyl)methane, 4,4'-diisocyanatodiphenyl ether and 2,3-bis(8-isocyanooctyl)-4-octyl-5-hexylcyclohexene. Polyisocyanates of higher isocyanate functionality can also be used. Examples of these are tris(4-isocyanatophenyl)methane, 1,3,5-triisocyanatobenzene, 2,4,6-triisocyanatotoluene, 1,3,5-tris(6-isocyanatohexyl)biuret, bis(2,5-diisocyanato-4-methylphenyl)methane, and polymeric polyisocyanates such as dimers and trimers of diisocyanatotoluene. In addition, mixtures of polyisocyanates can also be used. The organic polyisocyanates suitable as crosslinking agents in the invention can also be prepolymers derived, for example, from a polyol, including a polyether polyol or a polyester polyol.

Any suitable aliphatic, cycloaliphatic or aromatic alkyl monoalcohols can be used for blocking the polyisocyanates. Examples thereof are aliphatic alcohols, such as methyl, ethyl, chlororethyl, propyl, butyl, amyl, hexyl, heptyl, octyl, nonyl, 3,3,5-trimethylhexyl, decyl and lauryl alcohols; cycloaliphatic alcohols such as cyclopentanol and cyclohexanol; aromatic alkyl alcohols, such as phenyl carbinol and methyphenyl carbinol.

Other suitable blocking agents are hydroxylamines such as ethanolamine, oximes such as methyl ethyl ketone oxime, acetone oxime ano cyclohexanone oxime, or amines such as dibutylamine and diisopropylamine. The polyisocyanates and blocking agents mentioned can also be used, in suitable proportions, for the preparation of the partially blocked polyisocyanates described above.

Additives which are generally used, such as, for example, coalescing solvents, pigments, surfactants, crosslinking catalysts, antioxidants, fillers and antifoams, can be added to the aqueous coating compositions prepared using the binders according to the invention.

The aqueous systems prepared with the aid of the binders according to the invention are especially suitable for the cationic electrocoating process; they can, however, also be used in conventional coating methods. Metals, for example, pretreated if desired, such as iron, steel, copper, zinc, brass, magnesium, tin, nickel, chromium and aluminum, can be used as coating substrates, as well as impregnated paper and other electrically conducting substrates.

The binders according to the invention are also suitable for the preparation of pigment pastes, ie. the binders can also be used as grinding resins.

When the resin according to the invention is used as grinding resin for the preparation of a pigment paste, the proportions of the epoxide-containing organic material and the organic tertiary amine which are reacted with one another are preferably chosen such that the carrier resin contains 0.8 to 2.0 nitrogen atoms per molecule. Lower amounts of quaternary nitrogen can lead to poor pigment wettability, while higher amounts result in the resins being too water-soluble.

Pigment pastes according to the invention are prepared by comminuting or dispersing a pigment in the grinding resin in well-known manner. The pigment paste contains the grinding resin and at least one pigment as the essential ingredients.

In addition, however, other usual additives can be present in the pigment composition, such as plasticizers, wetting agents, surfactants or antifoams.

The grinding of the pigments usually takes place in ball mills, sand mills, Cowles mills and continuous mills until the pigment has been reduced to the desired particle size and preferably is wetted by the resin or dispersed in it. After the comminution, the particle size of the pigment should be in the region of 10 microns or less. In general, comminution is carried out to a Hegman number of about 6 to 8. The grinding is preferably carried out in an aqueous dispersion of the grinding resin. The amount of water present in the composition to be ground should be sufficient to form a continuous aqueous phase.

The well-known pigments can be used as pigments in the invention. Titanium dioxide is in general the sole or the pincipal white pigment. However, other white pigments or extenders, such as antimony oxide, zinc oxide, basic lead carbonate, basic lead sulfate, barium carbonate, porcelain, clay, calcium carbonate, aluminum silicate, silica, magnesium carbonate and magnesium silicate, can also be used. Examples of colored pigments which can be used are cadmium yellow, cadmium red, carbon black, phthalocyanin blue, chromium yellow, toluidine red and hydrated iron oxide. For further general information on the comminution of pigments and the formulation of coating compositions, the following books should be referred to:

D. H. Parker, Principles of Surface Coating Technology, Interscience Publishers, New York (1965)
R. L. Yates, Electropainting, Robert Draper Ltd., Teddington England (1966)
H. F. Payne, Organic Coating Technology, Volume 2, Wiley and Sons, New York (1961).

The modified epoxy resins should be capable of preparation on an industrial scale as far as possible without problems.

The invention also relates to a process for the preparation of water-dilutable binders for cationic electrocoating finishes based on modified epoxy resins, containing ammonium, sulfonium and/or phosphonium groups.

In the synthesis as well as the modification of epoxy resins, epoxide groups are opened with the formation of secondary hydroxyl groups. The secondary OH groups formed in this way can in turn undergo an addition reaction with an epoxide group, forming an ether bond and a new secondary hydroxyl group.

In industrial production of modified epoxy resins, difficulties arise with a failure to control the reaction by a suitable choice of reaction conditions to ensure that a sufficient number of reactive epoxide groups are available for the desired modification reactions to take place and that no resins with too high a viscosity or unusable gels are obtained as reaction products.

Attempts have hitherto been made to avoid the production difficulties outlined above by suppressing as substantially as possible the reaction between secondary hydroxyl groups and epoxide groups.

Thus, for example, it has been proposed to minimize the tendency to gel formation during the preparation of modified epoxy resins by a chain lengthening using organic polyols carrying at least two alcoholic primary OH groups (U.S. Pat. No. 4,104,147) or polymercapto componds (U.S. Pat. No. 4,260,720). The objective was to suppress reactions between the secondary hydroxyl groups and epoxide groups by reactions of the alcoholic primary OH groups reactive toward epoxide groups, or the mercapto groups, with the epoxide groups.

A further object of the present invention was to find novel ways for synthesizing modified epoxy resins which would be free from the production difficulties described above.

Surprisingly, this object was achieved by preparing the modified epoxy resins by a process wherein

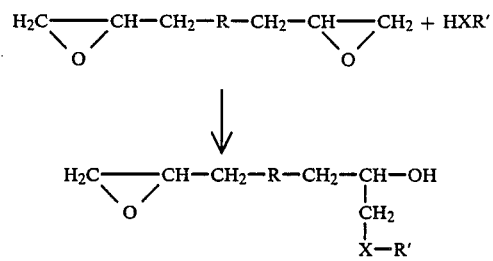

Step 2:

The secondary hydroxyl group formed in step 1 undergoes an addition reaction with another epoxide group

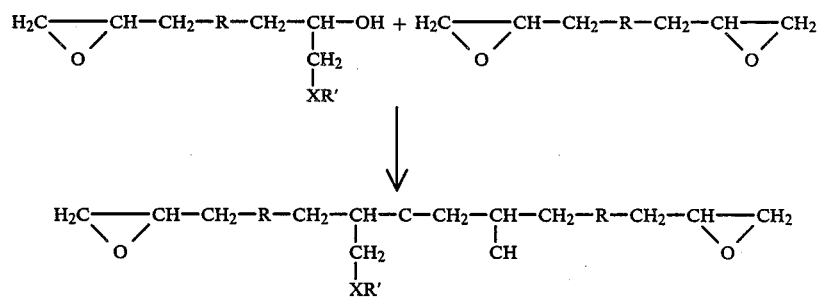

(A) a di-epoxide compound, or a mixture of di-epoxide compounds, having an epoxide equivalent weight below 2,000, is reacted with (B) a phenol or thiol group-containing compound which, under the given reaction conditions, reacts monofunctionally with epoxide groups, or a mixture of such compounds, and with (C) primary and/or secondary amines or their salts and/or the salt of a tertiary amine, a sulfide/acid mixture or phosphine/acid mixture or a mixture of these compounds, as well as, if desired, with (D) a polyfunctional alcohol, a polycarboxylic acid, a polyamine, a polysulfide, a polyphenol or a mixture of these compounds, the components A and B being used in a molar ratio from 10:1 to 1:1, preferably from 4:1 to 1.5:1, the reaction of component A with component B being carried out at 100° to 190° C., if desired in the presence of a catalyst, and, if further desired, the dilutability with water being obtained by protonization with a water-soluble acid.

In the process according to the invention, the number of secondary hydroxyl groups formed can be controlled in a simple manner via the molar ratio of the components A and B used and via the choice of reaction conditions in such a way that the production difficulties mentioned above do not occur and the reaction between secondary hydroxyl groups and epoxide groups which otherwise occurs as undesirable side reaction can now be utilized as a purpose-controlled main reaction for resin synthesis.

It is assumed that the resin synthesis gives rise to epoxy resins containing side groups by the following reaction scheme.

Step 1:

The monofunctionally reacting phenol or thiol compound R'XH opens one oxirane ring The process according to the invention is carried out in the following way:

Component A and component B are mixed and allowed fully to react at temperatures between 100° and 190° C., preferably 115° and 185° C., if desired in the presence of catalysts, for example tertiary amines. (The completeness of the reaction can be controlled by determining the epoxide equivalent weight.) The reaction product obtained in this manner can then be further modified with the component C and, if desired, also with the component D. The reaction with the component D can also take place prior to the reaction with component C.

The reaction between amines and epoxide group-containing compounds often starts as early as when the reactants are mixed. Depending on the course of reaction desired, it is recommended to raise the reaction temperature to from 50° to 150° C., especially to allow the reaction to go to completion.

The amount of amine used for the reaction with the epoxide-containing compound should be at least such that the resin acquires a cationic character, ie. that it migrates to the cathode in the coating bath under the influence of a voltage, when it has become water-dilutable by the addition of an acid. In essence, all epoxide groups of the resin can be reacted with an amine. However, it is also possible to leave excess epoxide groups in the resin.

A further possibility of achieving the required water dispersibility consists of using Mannich bases, ie. reaction products of suitable phenols carrying groups suitable for reacting with an epoxide ring, with formaldehyde and a secondary amine. In this way the binder becomes at the same time self-crosslinking.

The reaction with amine acid salts takes place at temperatures from 20° to 110° C. The reaction can occur without the addition of solvents, but in the presence of solvents such as aromatic hydrocarbons or monoalkyl ethers of ethylene glycol it becomes more easily controllable.

The ratio between the amine acid salt and the epoxide compound can fluctuate and the optimum ratios depend on the specific starting materials. In general, about 1 to about 50 parts by weight of salt are used for 100 parts by weight of polyepoxide. In general, the ratio is chosen according to the content of nitrogen derived from the quaternizing agent, which typically amounts to from about 0.05 to about 16%, based on the total weight of the amine salt and the polyepoxide.

The sulfide/acid mixture and the epoxide compound are reacted by mixing the components and warming them usually to moderately elevated temperatures, such as from 70° to 110° C. A solvent is unnecessary, although one is frequently used to control the reaction better. Suitable solvents are aromatic hydrocarbons, monoalkyl ethers of ethylene glycol and aliphatic alcohols. The proportions of the sulfide and the epoxide compound can vary, and the optimum proportions of the two components depend on the specific starting materials. However, about 1 to 50 parts by weight of sulfide are usually used per 100 parts by weight of the epoxide compound. The proportions are frequently based on the sulfur content, which typically is from about 0.1 to 35%, based on the total weight of the sulfide and the epoxide compound.

The phosphine/acid mixture and the epoxide compound are reacted by mixing the components and warming them sometimes to moderately elevated temperatures. The reaction temperature is not particularly critical and depends on the starting materials and their reaction velocities. Frequently, the reaction is satisfactorily rapid at room temperature or at elevated temperatures up to 70° C. In some cases it is advisable to use higher temperatures, such as about 110° C. or even higher. A solvent is unnecessary, although one can frequently be used to control the reaction better. Examples of suitable solvents are aromatic hydrocarbons, monoalkyl ethers of ethylene glycol and aliphatic alcohols. The proportions of the phosphine and the epoxide compound can be varied, and the optimum ratios depend on the specific starting materials. Normally, however, about 1 to about 50 parts by weight of phosphine are used per 100 parts by weight of the epoxide compound. The proportions are frequently given with reference to the proportion of phosphine, about 0.1 up to about 35% by weight of phosphine, based on the total weight of phosphine and epoxide compound, being typically used.

The modification with the component D is carried out at reaction temperatures from 80° to 170° C. The course of the reaction of the epoxy resin prepared from the components A and B with the components C and, if desired, D can be followed by the respective determination of the epoxide equivalent weight.

Advantageous embodiments of the process according to the invention are given in claims 8 to 14.

The invention also relates to a process for electrophoretic coating of an electrically conducting substrate, connected as a cathode, in an aqueous bath which contains, besides the usual additives, water-dilutable, cationic binders which have been either made self-crosslinkable by reaction or can be crosslinked by cross-linking agents present in the bath, and is characterized in that the binders are obtainable by reacting (A) a di-epoxide compound, or a mixture of di-epoxide compounds, with an epoxide having an equivalent weight below 2,000, with (B) a phenol or thiol group-containing compound which, under the given reaction conditions, reacts monofunctionally with epoxide groups, or a mixture of such compounds, and with (C) primary and/or secondary amines or their salts and/or the salt of a tertiary amine, a sulfide/acid mixture or phosphine/acid mixture or a mixture of these compounds, as well as, if desired, with (D) a polyfunctional alcohol, a polycarboxylic acid, a polyamine, a polysulfide, a polyphenol or a mixture of these compounds, the components A and B being used in a molar ratio from 10:1 to 1:1, preferably from 4:1 to 1.5:1, the reaction of component A with component B being carried out at 100° to 190° C., if desired in the presence of a catalyst, and, if further desired, the dilutability with water being obtained by protonization with a water-soluble acid.

For the cationic deposition, the objects to be coated are immersed in an aqueous dispersion of the solubilized film-forming cationic binder. An electric voltage is set up between the object to be coated, which serves as the cathode, and an anode, and the cationic binder is deposited on the cathode with the aid of the electric current. The object is then removed from the bath and usually rinsed. The coating is then cured by heating in the usual manner.

The invention is explained in further detail by the examples below. All parts and percentages are by weight, unless expressly stated otherwise. Preparation of a crosslinking agent I A blocked isocyanate crosslinking agent (polyurethane crosslinking agent) is prepared according to German Offenlegungsschrift No. 2,701,002, Example 1, by adding, slowly and with stirring in a nitrogen atmosphere, 218 parts of 2-ethylhexanol to 291 parts of an 80/20 isomeric mixture of 2,4/2,6-tolylenediisocyanate, the reaction temperature being maintained below 38° C. by external cooling. The mixture is maintained at 38° C. for a further half hour and is then warmed to 60° C., after which 75 parts of trimethylolpropane are added, following 0.08 part of dibutyltin dilaurate as catalyst. After an initial exothermic reaction the mixture is kept for 1.5 hours at 121° C., until essentially all the isocyanate groups are used up, which can be recognized from the infrared spectrum. The mixture is then diluted with 249 parts of ethylene glycol monoethyl ether. Preparation of a crosslinking agent II A polyester crosslinking agent is prepared according to European Pat. No. 40,867, Example 2d): 192 parts of trimellitic acid anhydride and 500 parts of versatic acid glycidyl ester, with an epoxide equivalent weight of 250, are mixed and warmed to 100° C. with stirring. An exothermic reaction takes place and the temperature rises to 190° C. After cooling to 140° C., 2 parts of benzyldimethylamine are added. The mixture is maintained for 3 hours at 140° C. A viscous, clear product is formed which is additionally diluted with 295 parts of ethylene glycol monobutyl ether.

Preparation of a crosslinking agent III

A crosslinking agent which possesses β-alkoxyalkyl ester groups which are active in the crosslinking is prepared as follows:

1,462 g of hexyl glycol (10 mol) are initially taken in a reaction vessel which is provided with a water separator, reflux condenser and interconnected Raschig column and is heatable by heat-transfer oil, and 1,000 g of succinic anhydride (10 mol) are added under an inert gas supply, with stirring. The reaction mixture is heated to 120° C., the exothermic heat of reaction briefly raising the temperature to 130° C. The temperature is maintained until the acid number reaches 230 mg KOH/g.

400 g of xylene, 5 g of N-cetyl-N,N,N-trimethylammonium bromide and 940 g of a bisphenol A-epoxy resin with an epoxide equivalent weight of 188 (2.5 mol) are then added. The temperature is again raised to 130° C. during 1 hour and maintained at this temperature until the epoxide value has dropped to 0. After an addition of 2 g of ptoluenesulfonic acid solution (25% in n-propanol), the temperature is raised to 200° C. during 4 hours, during which time the reaction water formed is continuously removed. After a further rise to 220° C. the temperature is maintained until about 90 g of water have separated off, and the acid number has dropped to below 2 mg of KOH/g of solid resin. The reaction mixture is then cooled and discharged without dilution.

Solid: 95.2% by weight (measured by heating for 1 hour at
130° C.).
Acid number: 1.1 mg of KOH/g of solid resin.
Viscosity: 480 mPas (measured after dilution with methyl
isobutyl ketone to 70% by weight at
25° C.).

Preparation of binder

The epoxy resin (liquid epoxy resin based on bisphenol A with an epoxide equivalent weight (EEW) of 188) is initially taken in a suitable reactor together with the phenol or thiol and heated to 160° C. under a nitrogen blanket. This temperature is maintained until EEW I is reached. The mixture is then cooled by the addition of methyl isobutyl ketone (MIBK) and by external cooling to 125° C., and benzyldimethylamine is added. The temperature again slightly increases and it is maintained at 130° C. until EEW II is reached. The crosslinking agent is then added and the mixture is cooled to 90° C. The ketimine (prepared from diethylenetriamine and an excess of MIBK, so that an amine equivalent weight of 125 results) and diethanolamine are added. The temperature is maintained for 1 hour at 110° C., propylene glycol monophenyl ether is then added and the mixture is stirred for 30 minutes.

In the meantime the dispersing bath is prepared from deionized water ($H_2O$ I) and glacial acetic acid. The solution of the resin is dispersed therein. After 30 minutes lead octoate is added and stirring is continued for a further 30 minutes. A further quantity of water is then added ($H_2O$ II) and stirring continued for 15 minutes. The dispersion is then filtered.

Preparation of a gray pigment paste 800 parts of butyl glycol are added to 953 parts of a commercial epoxy resin based on bisphenol A with an epxoide equivalent weight of 890. The mixture is heated to 80° C. 221 parts of a reaction product from 101 parts of di ethanolamine and 120 parts of an 80% aqueous lactic acid are then added to the resin solution. The reaction is carried out at 80° C. until the acid number has dropped below 1.

1,800 parts of this product are initially taken with 2,447 parts of deionized water, followed by 2,460 parts of $TiO_2$, 590 parts of an extender based on aluminum silicate, 135 parts of lead silicate and 37 parts of carbon black. This mixture is comminuted by grinding to a Hegman number of from 5 to 7. 1,255 parts of deionized water are added in order to obtain the desired paste consistency. This gray paste has a very long shelf life.

Preparation of electrocoating baths I to IV and deposition of coating films 2,000 parts by weight of each of the binder dispersions described above are mixed with 775 parts by weight of the gray pigment paste. The bath solids are adjusted to 20% with deionized water (150° C., 30 minutes). The bath is then allowed to age for 3 days with stirring. The deposition of the coating films on zinc phosphated panel takes place during 2 minutes. The bath temperature is 27° C. The deposited films are baked at 180° C. for 20 minutes.

| QUANTITIES WEIGHED CUT FOR BINDER PREPARATION | | | | |
|---|---|---|---|---|
| | B I | B II | B III | B IV |
| Epoxy resins | 1162 | 1310 | 1379 | 1265 |
| Phenol/Thiol | t-Butyl-phenol 348 | Phenol 262 | Methyl mercapto-acetate 324 | Thiophenol 278 |
| MIBK | 75 | 110 | 119 | 77 |
| Benzyldimethylamine | 8 | 7 | 10 | 8 |
| Crosslinking agent | 1062 Type I | 963 Type II | 598 Type III | 945 Type I |
| Diethanolamine | 120 | 109 | 96 | 132 |
| Ketimine | 144 | 94 | 82 | 114 |
| Propylene glycol monophenyl ether | 123 | 159 | 122 | 318 |
| $H_2O$ I | 1370 | 1690 | 1510 | 1670 |
| Glacial acetic acid | 49 | 50 | 67 | 68 |
| Lead octoate | 24 | 146 | 148 | 25 |
| $H_2O$ II | 2515 | 2100 | 2545 | 2100 |
| EEW I | 385 | 370 | 385 | 360 |
| EEW II | 950 | 1080 | 1350 | 900 |
| Solids (2 hours, 110° C.) | 34.8% | 35.7% | 35.3% | 34.9% |

B = binder

| RESULTS OF DEPOSITION | | | | |
|---|---|---|---|---|
| | Bath I | Bath II | Bath III | Bath IV |
| Binder dispersion | I | II | III | IV |
| Deposition voltage (V) | 380 | 320 | 350 | 350 |
| Film thickness (μm) | 21 | 18 | 23 | 20 |
| FORD throwing power (cm) | 20.7 | 21.0 | 19.8 | 22.5 |
| Course* | 0.5 | 1.0 | 0.5 | 1.0 |
| Crosshatch* | 0 | 0 | 0 | 0 |

| -continued | | | | |
|---|---|---|---|---|
| RESULTS OF DEPOSITION | | | | |
| | Bath I | Bath II | Bath III | Bath IV |
| Erichsen indentation (mm) | 8.3 | 9.5 | 9.0 | 8.7 |

*0 = best
5 = worst

What is claimed is:

1. A water-dilutable binder for cationic electrocoating finishes based on modified epoxy resins containing ammonium, sulfonium and/or phosphonium groups, wherein the binders are obtainable by reacting
   (A) a di-epoxide compound, or a mixture of di-epoxide compounds, having an epoxide equivalent weight below 2,000, with
   (B) a phenol or thiol group-containing compound which, under the given reaction conditions, reacts monofunctionally with epoxide groups, or a mixture of such compounds, and with
   (C) primary and/or secondary amines or their salts and/or the salt of a tertiary amine, a sulfide/acid mixture or phosphine/acid mixture or a mixture of these compounds, as well as, if desired, with
   (D) a polyfunctional alcohol, a polycarboxylic acid, a polyamine, a polysulfide, a polyphenol or a mixture of these compounds,
the components A and B being used in a molar ratio from 10:1 to 1:1, preferably from 4:1 to 1.5:1, the reaction of component A with component B being carried out at 100° to 190° C., if desired in the presence of a catalyst, and, if further desired, the dilutability with water being obtained by protonization with a water-soluble acid.

2. A binder as claimed in claim 1, wherein a bisphenol A diglycidyl ether with an epoxide equivalent weight below 2,000 is used as component A.

3. A binder as claimed in claim 1, wherein a compound of the formula $R^1$—OH is used as component B, in which formula $R^1$ can have the following meaning
   $R^1$ = aryl or

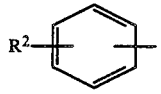

$R^2$ = H, alkyl (preferably of 1 to 20 carbon atoms, particularly preferably tert.-butyl, nonyl or dodecyl),
   $R^3$—O— (preferably in the para-position to the phenolic OH group) with $R^3$ = alkyl (preferably of 1 to 10 carbon atoms, particularly preferably methyl) or HO—(—$CHR^4CH_2$—O)$_n$—$CHR^4CH_2$—
   in which n=0–10 and $R^4$ = H or methyl or a compound of the formula $R^5$—SH, in which $R^5$ may have the following meaning
   $R^5$ = alkyl (preferably of 1 to 20 carbon atoms, particularly preferably n-butyl and dodecyl), cycloalkyl (preferably cyclohexyl), aryl (particularly preferably phenyl), aralkyl (particularly preferably benzyl), $R^6$—OOC—$CH_2$—, $R^7$—OOC $CH_2CH_2$—
   $R^6, R^7$ = alkyl of 1 to 8 carbon atoms, preferably butyl or 2-ethylhexyl
   or a mixture of these compounds is used as component B.

4. A binder as claimed in claim 1, wherein the compounds listed as component D have molecular weights of from 100 to 3,500, preferably from 350 to 1,000.

5. A binder as claimed in claim 1, wherein the proportion of the amount of component D used was 5 to 60 per cent by weight, based on the sum of the components A, B and D, and was chosen in relation to the molecular weight of component D so that the molar ratio between the reaction product of A and B and the component D was from 4:1 to 0.8:1, preferably 2:1.

6. A binder as claimed in claim 1, wherein component D is a polyphenol or a mixture of polyphenols of the formula (I).

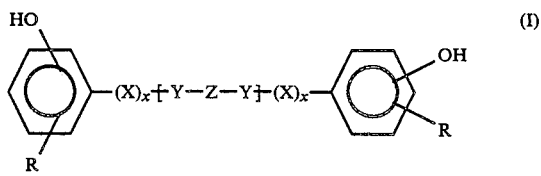

in which:
   X = alkylene, arylene, alkarylene
   O, O-alkylene, O-arylene, O-alkarylene
   S, S-alkylene, S-arylene, S-alkarylene
   CO, CO-alkylene, CO-arylene, CO-alkarylene
   NH, NH-alkylene, NH-arylene, NH-alkarylene
   x = b 0 or 1
   Y =

Z = a divalent hydrocarbon radical or divalent radical based on polyesters, polyethers, polyamides, polycarbonates, or polyurethanes
   R = H, $CH_3$, alkyl, —O, —O—alkyl, —$NO_2$, $NR'_2$, —NR'R", —NHCOR''', R', R", and R''' being alkyl groups.

7. A binder as claimed in claim 1, wherein the binder has been made self-crosslinkable by reaction and/or contains a crosslinking agent.

8. A process for the preparation of water-dilutable binders for cationic electrocoating finishes based on modfied epoxy resins containing ammonium, sulfonium and/or phosphonium groups, wherein
   (A) a di-epoxide compound, or a mixture of di-epoxide compounds, having an epoxide equivalent weight below 2,000 is reacted with
   (B) a phenol or thiol group-containing compound which under the given reaction conditions reacts monofunctionally with epoxide groups, or a mixture of such compounds, and with
   (C) primary and/or secondary amines or their salts and/or the salt of a tertiary amine, a sulfide/acid mixture or phosphine/acid mixture or a mixture of these compounds, as well as, if desired, with
   (D) a polyfunctional alcohol, a polycarboxylic acid, a polyamine, a polysulfide, a polyphenol or a mixture of these compounds
the components A and B being used in a molar ratio from 10:1 to 1:1, preferably from 4:1 to 1.5:1, the reaction of component A with component B being carried out at 100° to 190° C., if desired in the presence of a catalyst, and, if further desired, the dilutability with water being obtained by protonization with a water-soluble acid.

9. A process as claimed in claim 8, wherein a bisphenol A diglycidyl ether of an epoxide equivalent weight below 2,000 is used as component A.

10. A process as claimed in claim 8, wherein a compound of the formula R¹—OH is used as component B, in which formula R¹ can have the following meaning
R¹=aryl or

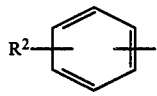

R²=H, alkyl (preferably of 1 to 20 carbon atoms, particularly preferably tert.-butyl, nonyl or dodecyl), R³—O (preferably in p-position to the phenolic OH group) with R³=alkyl (preferably of 1 to 10 carbon atoms, particularly preferably methyl) or HO—(—CHR⁴CH₂—O)$_n$—CHR⁴CH₂— with n=0–10 and R⁴=H or methyl or a compound of the general formula R⁵—SH, in which R⁵ may have the following meaning R⁵=alkyl (preferably of 1 to 20 carbon atoms, particularly preferably n-butyl or dodecyl), cycloalkyl (preferably cyclohexyl), aryl (particularly preferably phenyl), aralkyl (particularly preferably benzyl), R⁶—OOCCH₂—, R⁷—OOC CH₂CH₂—R⁶, R⁷=alkyl of 1 to 8 carbon atoms, preferably butyl or 2-ethylhexyl or a mixture of such compounds.

11. A process as claimed in claim 8, wherein the compounds used as component D have molecular weights from 100 to 3,500, preferably 350 to 1,000.

12. A process as claimed in claim 8, wherein the proportion of component D used amounts to from 5 to 60 percent by weight, based on the sum of components A, B and D, and is chosen in relation to the molecular weight of the component D so that the molar ratio between the reaction product of A and B and the component D amounts to from 4:1 to 0.8:1, preferably 2:1.

13. A process as claimed in claim 8, wherein a polyphenol or a mixture of polyphenols of the formula (I) is used as component D:

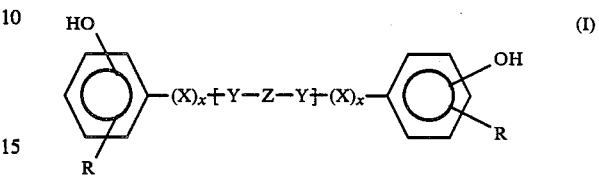

in which
X=alkylene, arylene, alkarylene O, O-alkylene, O-arylene, O-alkarylene S, S-alkylene, S-arylene, S-alkarylene CO, CO-alkylene, CO-arylene, CO-alkarylene NH, NH-alkylene, NH-arylene, NH-alkarylene
x=0 or 1
Y=

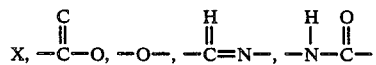

Z=alkylene or an alkylene radical based on polyesters, polyethers, polyamides, polycarbonates or polyurethanes
R=H, CH₃, alkyl, —O—CH₃, —O—alkyl, —NO₂, NR′₂, —NR′R″, —NHCOR‴.

14. A process as claimed in claim 9, wherein the binders are made self-crosslinkable by reaction and/or a crosslinking agent is added.

* * * * *